United States Patent [19]

Morishita

[11] Patent Number: 4,870,875
[45] Date of Patent: Oct. 3, 1989

[54] DRIVING DEVICE FOR AUXILIARY DEVICE

[75] Inventor: Akira Morishita, Hyogo, Japan

[73] Assignee: Mitsubishi Denki Kabushiki Kaisha, Tokyo, Japan

[21] Appl. No.: 175,436

[22] Filed: Mar. 30, 1988

[30] Foreign Application Priority Data

Apr. 3, 1987 [JP] Japan .................................. 62-83157

[51] Int. Cl.[4] ............................................. F16H 3/44
[52] U.S. Cl. .................................... 74/785; 192/12 D
[58] Field of Search .............. 74/785; 192/12 D, 18 B

[56] References Cited

U.S. PATENT DOCUMENTS

| | | | |
|---|---|---|---|
| 2,284,047 | 5/1942 | Edwards | 74/785 |
| 2,870,655 | 1/1959 | Rockwell | 74/785 |
| 4,484,495 | 11/1984 | Mason | 74/785 |
| 4,592,251 | 6/1986 | Mason | 192/18 B X |

FOREIGN PATENT DOCUMENTS

| | | | |
|---|---|---|---|
| 0132023 | 1/1985 | European Pat. Off. | 74/785 |
| 2102515 | 2/1983 | United Kingdom | 74/785 |

*Primary Examiner*—Dirk Wright
*Attorney, Agent, or Firm*—Sughrue, Mion, Zinn, Macpeak & Seas

[57] ABSTRACT

A driving device for an auxiliary device of an engine, comprises a carrier to be rotated by a crankshaft of the engine, a plurality of planet gears supported by shafts formed on the carrier, an internal gear meshed with the planet gears and supported rotatably, a clutch member for engaging the internal gear with and disengaging it from a stationary portion of the device, an engaging member for engaging the carrier with the internal gear when a rotation speed of the carrier reaches a value not less than a predetermined value to rotate the internal gear at the same speed as that of the carrier and an output shaft having a sun gear meshed with the planet gears and supported rotatably by the stationary portion of the device.

4 Claims, 3 Drawing Sheets

DRIVING DEVICE FOR AUXILIARY DEVICE

BACKGROUND OF THE INVENTION

The present invention relates to a driving device for an auxiliary device of an engine, such as alternator, a compressor of an air conditioning device or an oil pump which is to be driven by the engine through the driving device.

These peripheral or auxiliary devices are usually driven in sole or in combination by an output power of the engine through belts 7 and 8 provided between a pulley 6 mounted on a crankshaft 5 of the engine and pulleys 3 and 4 mounted on respective input shafts 1 and 2 of the auxiliary devices, as shown in FIG. 6.

Since, among other auxiliary devices, the alternator can provide an output power which can be maintained relatively constant so long as its input shaft is rotated at a speed high enough to obtain a desired output power, it has been proposed to make the pulley 3 mounted on the input shaft of the alternator smaller than that mounted on the crankshaft of the engine to keep a rotation speed of the input shaft of the alternator high enough while making the alternator compact. When it is desired to obtain an effect which cannot obtained by making the size of the pulley 3 minimum possible size, the pulley 6 mounted on the crankshaft 5 of the engine has been made larger to increase a pulley ratio to thereby increase the rotational speed of the input shaft of the alternator.

In the latter approach, however, another problem is created. That is, in order to use another auxiliary device such as an oil pump which is to be driven by the same pulley 6 within a designed rotational speed range, the pulley 4 on the input shaft 2 thereof must be made larger with the increase of the size of the pulley 6.

SUMMARY OF THE INVENTION

An object of the present invention is to provide a driving device for auxiliary devices of an engine, which is capable of rotating their input shafts at high speeds without making the size of a pulley mounted on a crankshaft of the engine larger.

According to the present invention, the above object is achieved by a driving device for auxiliary devices of an engine comprising a carrier to be rotated by the engine, a plurality of planet gears supported by shafts implanted in the carrier, an internal gear meshed with the planet gears and supported rotatably, a clutch means for engaging the internal gear with and disengaging it from a stationary portion of the device, an engaging means for engaging the carrier with the internal gear when a rotation speed of the carrier reaches a value not less than a predetermined value to rotate the internal gear together with the carrier and an output shaft having a sun gear meshed with the planet gears and supported rotatably by the stationary portion of the device.

According to the driving device of the present invention, when the carrier is rotated by the engine with the internal gear being engaged with the stationary portion of the device by the clutch means, the planet gears supported by the carrier orbit so that the sun gear rotates at high speed. Since the sun gear is fixedly mounted on the output shaft, the latter is rotated at high speed correspondingly. When the rotational speed of the carrier reaches the predetermined value, the clutch means is actuated to disengage the internal gear from the stationary portion of the device and, simultaneously, the engaging means provided on the carrier causes the latter to engage with the internal gear, so that the internal gear can rotate together with the carrier. Thus, the sun gear rotates at the same speed as that of the carrier.

DETAILED DESCRIPTION OF THE PREFERRED EMBODIMENT

Figure 1:
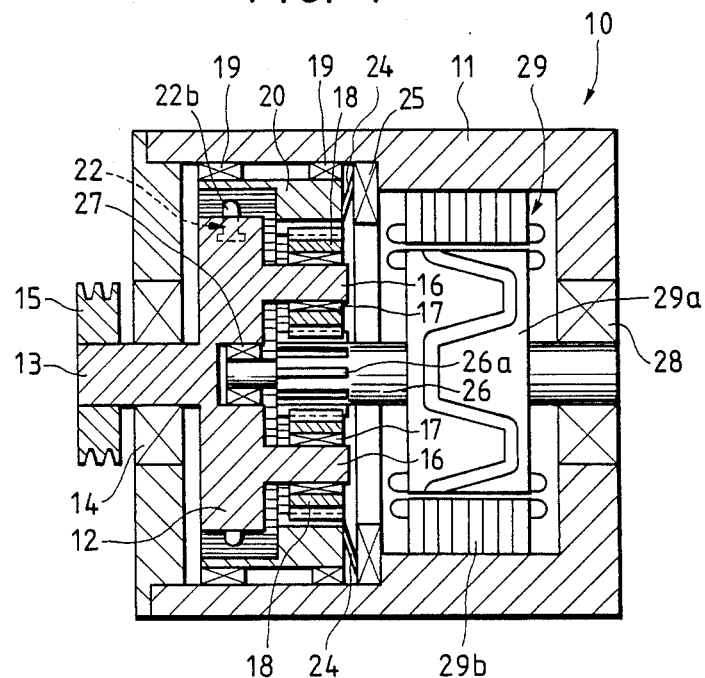
FIG. 1 is a cross section of a driving device for auxilary devices of an engine according to an embodiment of the present invention.

In FIG. 1 which shows an embodiment of the present invention in cross section, a driving device for an auxiliary device is depicted by a reference numeral 10, generally. The driving device 10 includes an alternator as an auxiliary device and comprises a housing 11 and a disc shaped carrier 12 arranged in the housing 11. The carrier 12 has an input shaft 13 formed integrally with a center portion of a left side end thereof in an axially aligned relation to a rotation center axis thereof. The input shaft 13 is rotatably supported by a bearing 14 supported by the housing 11 and protrudes from the housing 11. A pulley 15 is fixedly mounted on an end portion of the input shaft 13.

Figure 2:
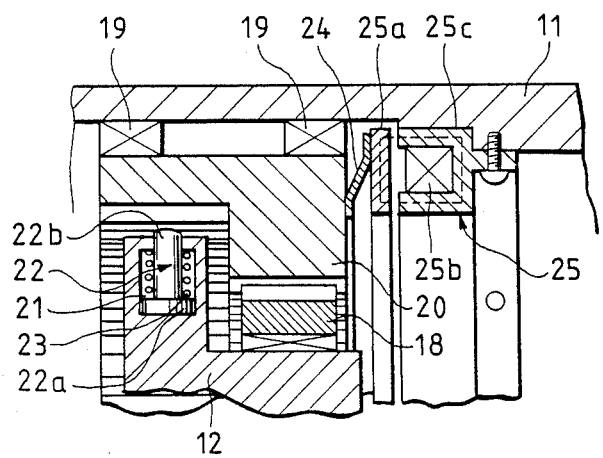
FIG. 2 is an enlarged cross section of a portion of the driving device shown in FIG. 1.

A pair of arms 16 protrude from a right side end surface of the carrier 12, on each of which a planet gear 18 is rotatably mounted through a bearing 17. Outside of an orbit of the planet gears 18, an internal gear 20 is rotatably supported by a bearing 19 pressure-inserted into an inner periphery of the housing 11 and is meshed with the planet gears 18. A plurality of radial blind holes 21 are formed in an outer periphery of the carrier 12 as shown in FIG. 2, in each of which a centrifugal member 22 is disposed. The centrifugal member 22 includes a base portion 22a in the form of a disc and an engaging portion 22b extending radially from the base portion 22a. The centrifugal member 22 is biased by a spring 23 provided between the base portion 22a and a shoulder of the blind hole 21 defining an opening of a reduced diameter such that the engaging portion 22b of the centrifugal member 22 is normally kept retracted with an free end thereof being protruded slightly from the outer peripheral surface of the carrier 12. The internal gear 20 has a cylindrical extension which covers the outer periphery of the carrier 12. An internal gear teeth are also formed in an inner surface of the cylindrical extension of the internal gear 20, with which the free end of the engaging portion 22b of the centrifugal member 22 is adapted to mesh under a certain condition.

A resilient member 24 in the form of tapered dish is provided on the right side of the internal gear 20 with a smaller diameter portion thereof being in contact with the right side surface of the internal gear 20 and a larger diameter portion thereof being secured to an armature 25a in the form of ring. The ring armature 25a faces to a ring shaped core 25c having a generally C shaped cross section and including a magnetizing coil 25b therein. The ring shaped core 25c is fixedly supported by the housing 11 with an air gap between the core 25c and the ring armature 25a. The armature 25a, the magnetizing coil 25b and the ring shaped core 25c constitute an electromagnetic clutch means 25.

A solar gear 26a is provided at the center of the orbit of the planet gears 18, which is formed on an output shaft 26 supported at one end by a bearing 27 supported in a circular recess formed in a center portion of the right side surface of the carrier 12 and at the other end by a bearing 28 supported by the housing 11. In this embodiment, the output shaft 26 is also used as a rotary shaft of the alternator 29 constituted with a rotor 29a fixedly secured on the output shaft 26 and a stator 29b mouned on an inner peripheral wall of the housing 11.

Figure 3:
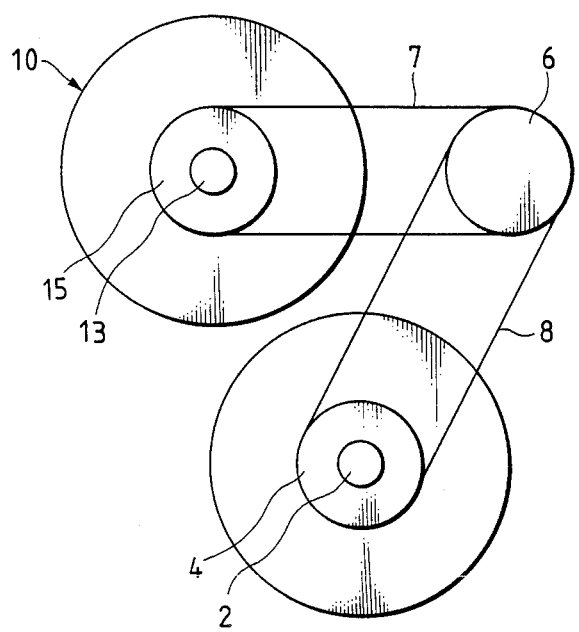
FIG. 3 a belted linkage between a pulley mounted on a crankshaft of the engine and a pulley of the driving device shown in FIG. 1.

In operation, the pulley 15 mounted on the input shaft 13 of the driving device of the present invention is connected by belt 7 to a pulley 6 mounted on the crankshaft of the engine as shown in FIG. 3 and rotated thereby. The rotation of the pulley 15 and hence the input shaft 13 causes an orbital movement of the planet gears 18 supported by the arms 16 of the carrier 12 around the sun gear 26a. In this case, the internal gear 20 is prevented from rotating because the armature 25a is magnetically attracted by the core 25c against the spring member 24, and, therefore, the sun gear 26a is rotated at a higher speed than that of the input shaft 13. As a result, the rotary shaft of the alternator 29 having the sun gear 26a thereon is rotated at the corresponding higher speed.

The rotational speed of the output shaft 26 of the present driving device 10 is proportional to the increasing ratio of speed given by the planet gear mechanism. That is, with an increase of the engine revolution, the revolution speed of the output shaft 26 increases proportionally to the increasing ratio of the planet gear mechanism. Therefore, if such high revolution of the output shaft 26 were transmitted directly to the rotary shaft of the alternator 29 when the engine revolution is high, the revolution speed of the rotor 29a of the alternator 29 would become too high, causing mechanical damage to the rotor 29a due to centrifugal force etc.

In the present invention, when the rotational speed of the carrier 12 exceeds the predetermined value, the centrifugal members 22 arranged peripherally of the carrier 12 are forced radially outwardly by centrifugal force against the spring forces of the springs 23 and the free ends of the engaging portions 22b of the centrifugal members 22 are forced to engage with corresponding teeth of the cylindrical extension of the internal gear 20, so that the carrier 12 is coupled to the internal gear 20. At the same time, a current supply to the magnetizing coil 25b of the electromagnetic clutch 25 is cut off so that the armature 25a is allowed to be disengaged from the core 25c by the return force of the spring member 24. As a result, the carrier 12 which rotates together with the internal gear 20 causes a rotation of the sun gear 26a at the same angular speed and, therefore, the output shaft 26 and the input shaft 13 rotate at the same angular speed.

The output power of the alternator 29 increases with increase of rotational speed and, then, saturates with a further increase of the speed. Therefore, when the engine rotation becomes higher, it is possible to maintain an enough amount of output power even if the alternator 29 is rotated at the same speed as that of the input shaft 13. That is, in driving the alternator 29 by the present driving device 10, it is possible to obtain a high output power as shown by a solid line A in FIG. 4 since, when the engine is in an idling condition or is rotating at a low speed, the alternator 29 rotates at a higher speed. On the other hand, when the engine revolution is high, the rotation speed of the alternator 29 becomes the same as that of the input shaft 13 which is high enough to obtain compatible output power. This effect can be obtained with an additional advantage of damage free structure of the mechanism including the rotor 29a.

Figure 4:
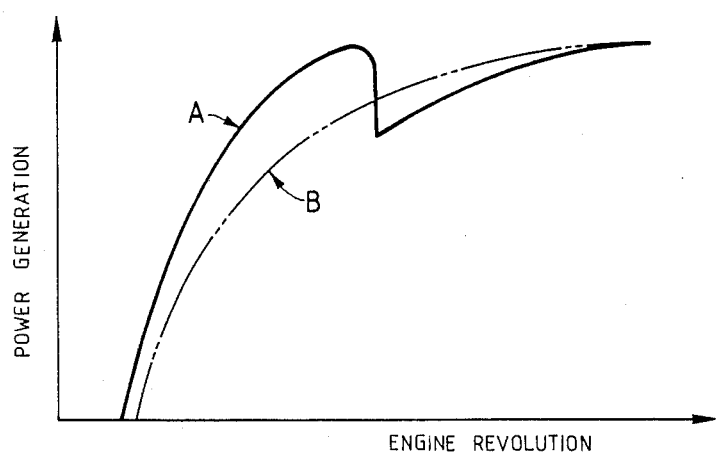
FIG. 4 is a graph showing a relation between engine revolution and power generation when the auxiliary device to be driven by the present driving device is an alternator.

A dotted line B in FIG. 4 shows an alternator output characteristic when the alternator is driven according to the conventional method without using the driving device such as the present device 10.

Although the alternator is described as the auxiliary device, the present driving device can be applied to other auxiliary devices such as a compressor for an air-conditioner, etc.

In the present driving device 10, the size of the pulley 15 mounted on the input shaft 13 can be the same as that of the pulley 6 mounted on the engine crankshaft as shown in FIG. 3. This means that the driving force transmission efficiency between the pulleys 15 and 6 becomes a maximum because a total contact angle between the belt and the pulleys becomes a maximum and the possibility of slippage therebetween becomes a minimum.

Figure 5:
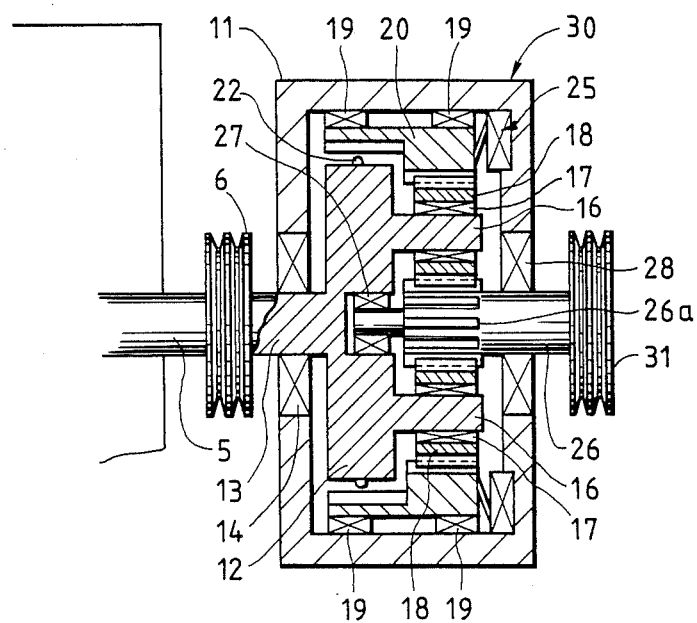
FIG. 5 is a cross section of another embodiment of the present invention.
Figure 6:
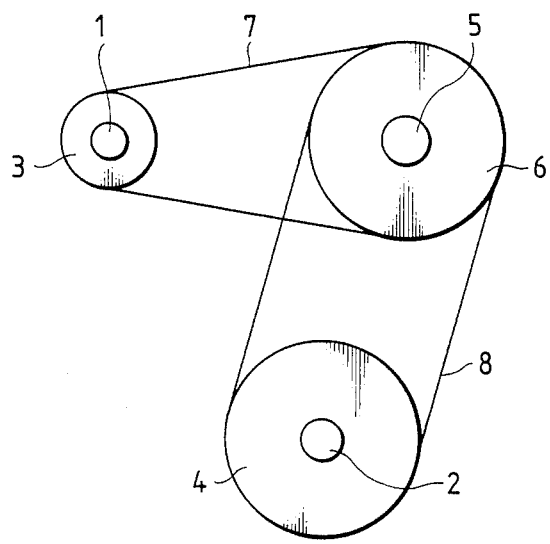
FIG. 6 shows a belted relation between a pulley mounted on a crankshaft and a pulley of an auxilary device in a conventional driving device.

FIG. 5 shows another ebodiment of the present invention, in which the present driving device is depicted by a reference numeral 30. The driving device 30 has no auxiliary device such as the alternator 29 in FIG. 1 and an input shaft 13 thereof is connected directly to a crankshaft 5 of an engine by means of a suitable joint. An output shaft 26 protrudes outwardly of a housing 11 through a bearing 28 supported by an opening of the housing 11 and has an end on which a pulley 31 is mounted for a connection to a suitable auxilary device. With a belt provided between the pulley 31 of the driving device 30 and an input side pulley of the auxilary device, the latter is driven by the engine through the driving device 30 in the same manner as that of the device 10 in FIG. 1.

Other components of the driving device 30 are substantially the same as those of the driving device 10 and, so, depicted by the same reference numerals, respectively. A detailed description thereof is, therefore, omitted for avoidance of duplication.

As described hereinbefore, according to the driving device of the present invention, it is possible to drive an auxiliary device at high speed during the time an engine rotates at low speed without using a large pulley on a crankshaft of the engine. Therefore, it is possible to use a small pulley for driving power transmission. Further, according to the present driving device, it is possible to prevent the auxiliary device from being damaged when the engine rotation increases too much, since although the rotational speed of the auxiliary device increases in proportion to the increasing ratio of speed given by the driving device when the engine rotation increases, the output shaft of the driving device rotates at the same speed as that of the input shaft thereof when the engine revolution exceeds a predetermined value.

What is claimed is:

1. A driving device for an auxiliary device of an engine, comprising a carrier to be rotated by a crankshaft of the engine, a plurality of planet gears supported by shafts formed on said carrier, an internal gear meshed with said planet gears and supported rotatably, a clutch means for engaging said internal gear with and disengaging it from a stationary portion of said device, an engaging means for engaging said carrier with said internal gear when a rotation speed of said carrier reaches a value not less than a predetermined value to rotate said internal 10 gear at the same speed as that of said carrier and an output shaft having a sun gear meshed with said planet gears and supported rotatably by said stationary portion of said device.

2. The driving device as claimed in claim 1, wherein said clutch means comprises an electromagnetic clutch.

3. The driving device as claimed in claim 2, wherein said engaging means comprises at least one centrifugal member provided in said carrier and spring biased to a disengaging position normally, said centrifugal member being adapted to engage with said internal gear against the biasing force of said spring when the rotation speed of said carrier exceeds a predetermined value.

4. The driving device as claimed in claim 3, wherein said carrier has an input shaft having an end mounted with a pulley and said crankshaft of said engine mounts a pulley having the same diameter as that of said pulley of said carrier and wherein said input shaft of said carrier is rotated by a belt provided between said pulleys.

* * * * *